(12) United States Patent
O'Brien

(10) Patent No.: US 6,446,658 B1
(45) Date of Patent: Sep. 10, 2002

(54) BLEED MEMBER AND BLEED VALVE ASSEMBLY

(75) Inventor: Richard C. O'Brien, Oxford, CT (US)

(73) Assignee: Bic Corporation, Milford, CT (US)

( * ) Notice: Subject to any disclaimer, the term of this patent is extended or adjusted under 35 U.S.C. 154(b) by 0 days.

(21) Appl. No.: 09/642,857

(22) Filed: Aug. 21, 2000

(51) Int. Cl.$^7$ ............................................... F16K 15/16
(52) U.S. Cl. ..................... 137/223; 137/843; 446/224
(58) Field of Search ................. 137/843, 223; 446/224

(56) References Cited

U.S. PATENT DOCUMENTS

| | | | | |
|---|---|---|---|---|
| 603,269 A | * | 5/1898 | Fritschle | 137/223 |
| 625,114 A | * | 5/1899 | MacSpadden | 137/223 |
| 1,051,738 A | * | 1/1913 | Kavanagh | 137/223 |
| 1,370,178 A | * | 3/1921 | Albert | 137/223 |
| 2,589,716 A | * | 3/1952 | Marsh | 137/223 |
| 2,926,692 A | * | 3/1960 | Zillman et al. | 137/843 |
| 3,192,949 A | * | 7/1965 | De See | 137/903 X |
| 3,399,677 A | * | 9/1968 | Gould et al. | 137/223 X |
| 3,804,113 A | * | 4/1974 | Garcea | 137/843 |
| 4,230,149 A | * | 10/1980 | Worthen et al. | 137/843 |
| 4,935,773 A | | 6/1990 | Meacham | 355/92 |
| 4,999,932 A | | 3/1991 | Grim | 36/88 |
| 5,141,463 A | * | 8/1992 | Rouse, Jr. | 137/223 |
| 5,144,708 A | | 9/1992 | Pekar | 5/454 |
| 5,144,986 A | * | 9/1992 | Drew | 137/843 |
| 5,881,772 A | * | 3/1999 | Bennett | 137/846 |
| 5,996,250 A | | 12/1999 | Reed et al. | 36/3 R |
| 6,196,260 B1 | * | 3/2001 | Pekar | 137/223 |

* cited by examiner

Primary Examiner—John Rivell
Assistant Examiner—Meredith H. Schoenfeld
(74) Attorney, Agent, or Firm—Pennie & Edmonds LLP

(57) ABSTRACT

The present invention relates to a bleed member provided in a bleed valve assembly having a wall member defining a fluid chamber for retaining a fluid therein. The bleed member has an aperture defined in the wall member and a flexible sealing member located inside the fluid chamber for selectively covering and sealing the aperture. According to the present invention, in a preloading state, the flexible sealing member covers and seals the aperture and, in a venting state, the sealing member is forced to be unseated from the aperture to vent fluid from the valve member. The wall member is preferably flexible and the sealing member may be formed of a material which is flexible and conforms to the shape and configuration of the wall member to seal the aperture.

28 Claims, 3 Drawing Sheets

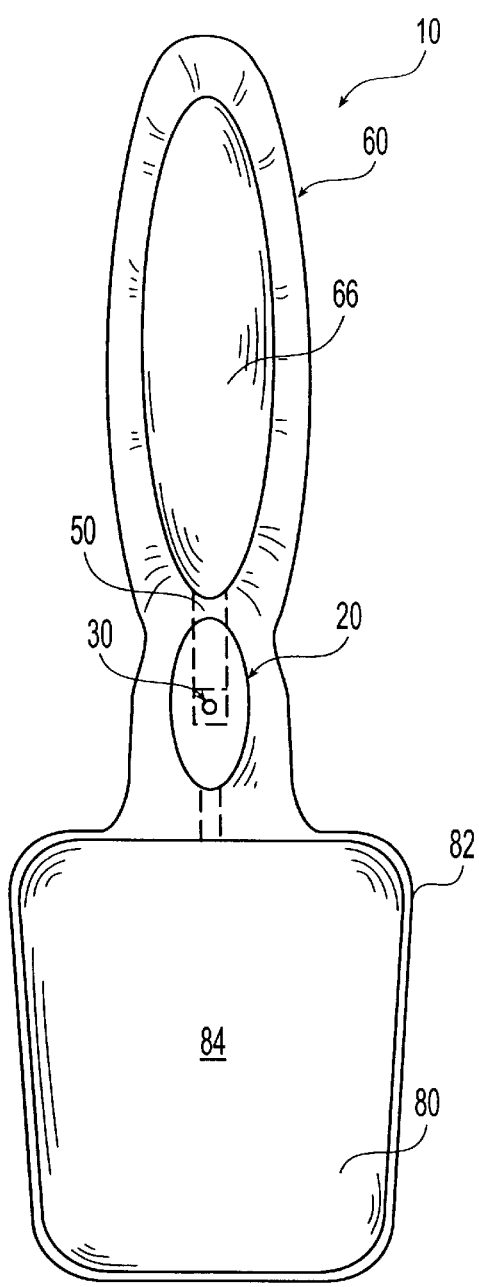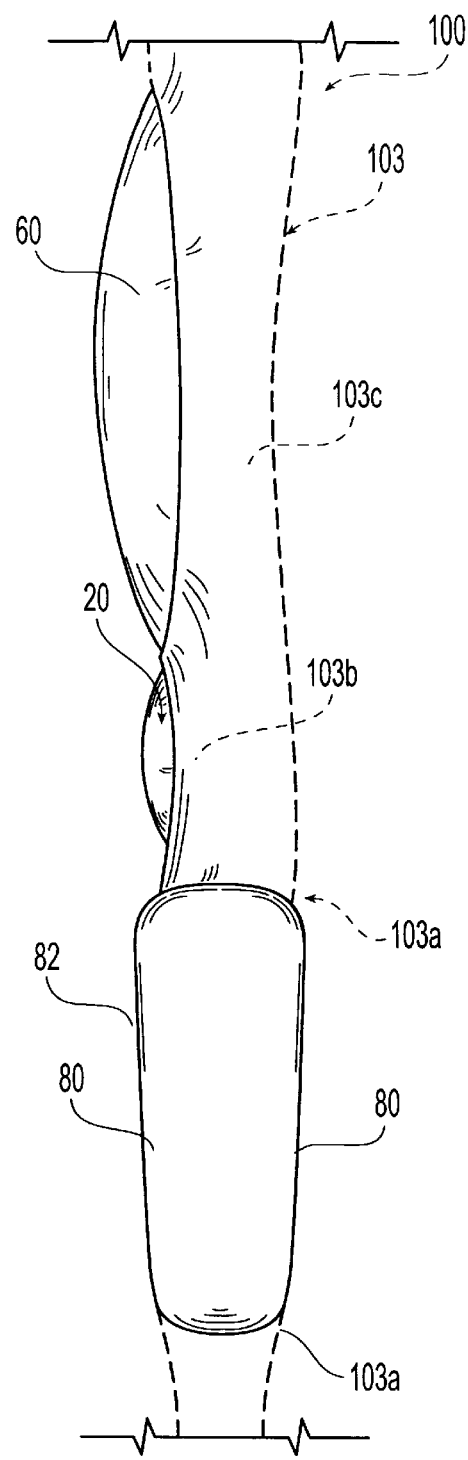
Fig. 1
Fig. 2

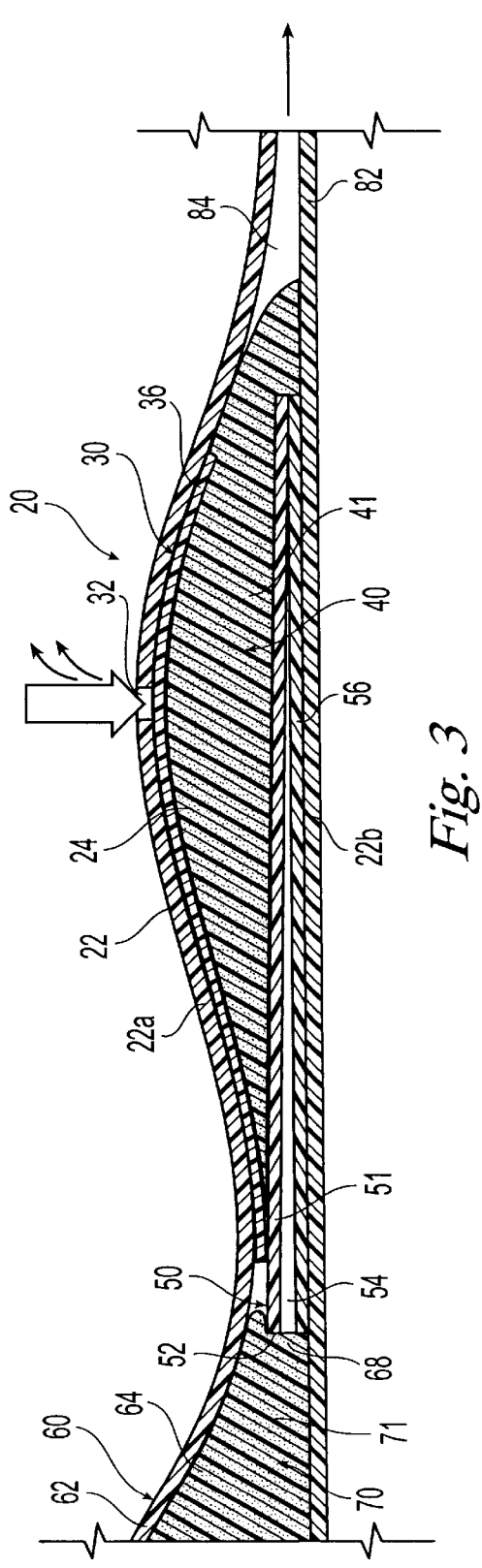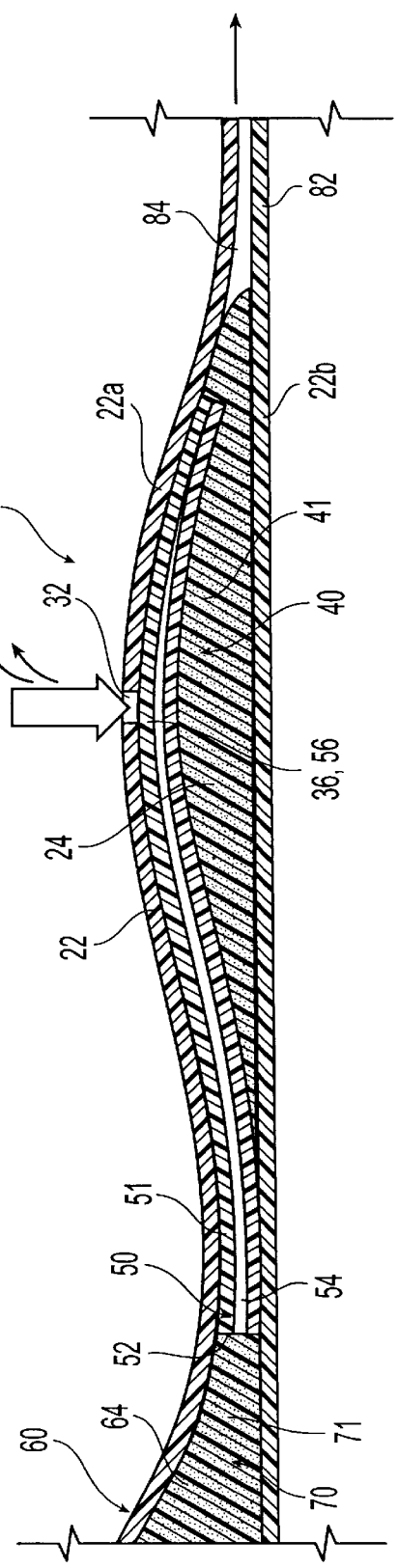
Fig. 3
Fig. 4

BLEED MEMBER AND BLEED VALVE ASSEMBLY

FIELD OF THE INVENTION

The present invention relates generally to a bleed member used in connection with a bladder member for venting an excess fluid therefrom. The present invention also relates to a bleed valve assembly which has a simple and compact structure and which is inexpensive and easy to manufacture and easy to assemble onto a bladder member. In addition, the present invention relates to a bladder member that employs such a bleed valve assembly for venting an excess fluid in the bladder member.

BACKGROUND OF THE INVENTION

Bleed valves or exhaust valves are commonly used along with pump devices for inflating various articles to a desired pressure level. When excessive fluid is pumped into the article, bleed valves or exhaust valves can function to release fluid from the fluid chamber of the article. Thereby the article may obtain a desirable pressure inside the fluid chamber. The combination of bleed valves and pump devices is particularly useful in connection with inflatable cushion structures that require different interior pressures for use in different applications.

U.S. Pat. No. 5,144,708 issued to Pekar employs a typical bleed valve or exhaust valve. The bleed valve in Pekar includes a base and a movable stem received inside the base. The base and the movable stem have fluid passages therein for venting fluid therethrough. In a normal position, the stem is biased against the base by a spring to close the fluid passages so that the inflated fluid is sealed inside the valve chamber. When pressing the stem toward the base, the fluid passages in the base and the stem communicate with each other so that fluid will vent from the valve chamber.

Conventional bleed valves tend to have bulky and complex structures. Due to their bulky structures, conventional bleed valves are not well suited to compact articles, such as hand-held articles. More particularly, bulky bleed valves do not meet aesthetic design requirements for various products. Further, the complex structures of conventional bleed valves make them more expensive to manufacture.

Therefore, it is desirable to provide a novel bleed valve device that has a compact and simple structure and that is simple and inexpensive to manufacture. Moreover, it is desirable to provide a novel bleed valve device that has a streamlined configuration that enhances aesthetic appeal.

SUMMARY OF THE INVENTION

The present invention relates to a bleed member provided in a bleed valve assembly comprising a wall member defining a fluid chamber for retaining a fluid therein. The bleed member has an aperture defined in the wall member, and a sealing member located inside the fluid chamber for selectively covering and sealing the aperture. In a preloading state, the sealing member covers and seals the aperture and, in a venting state, the sealing member is forced to be unseated from the aperture to vent fluid from the valve member. The present invention further relates to a bleed valve assembly comprising a fluid chamber for retaining a fluid therein and a bleed member for venting excess fluid from the fluid chamber.

The wall member and the sealing member may be made of a flexible material. More preferably, the sealing member is a flexible flap member capable of conforming to a flexible wall member in which the aperture is formed. To secure the relative position between the flap member and the aperture in the wall member, the flap member may be partially fixed to the wall member of the fluid chamber.

Alternatively, or in addition, the wall member and the sealing member may be made of materials which permit the sealing member to conform intimately with and to seal a corresponding portion of the wall member, thereby covering and sealing the aperture in a preloading state. Such materials should also permit the sealing member to be selectively unseated from the aperture upon application of a dislodging force to vent fluid from the fluid chamber in a venting state. In a preferred embodiment of the bleed valve assembly, the sealing member is made of a material that is both flexible as well as capable of conforming to and sealing against the wall member defining the fluid chamber.

A resilient support member may be provided inside the fluid chamber to assist in biasing the sealing member into a sealing position against the aperture. The support member can be a foam member shaped to be accommodated in the fluid chamber. In a preferred embodiment, the support member, the sealing member, and the wall member are sealed together to provide an airtight fluid chamber.

The bleed valve assembly of the present invention can further include an inlet member at least partially defined in the wall member for introducing a fluid into the fluid chamber. In a preferred embodiment, the inlet member includes a one-way valve located inside the fluid chamber. The valve has an inlet end sealingly joined to the portion of the wall member surrounding the inlet member. In addition, the valve preferably has an inlet duct fluidly communicated with the inlet member on the wall member. In one embodiment of the bleed valve assembly, the valve acts as a sealing member, thus obviating the need for a separate sealing member.

The bleed member or bleed valve assembly of the present invention can be used in connection with a fluid chamber, such as provided in or in fluid communication with a cushion member. The user may inflate the cushion member to a desired pressure level by pumping air into the fluid chamber via an integrally or separately formed pump member and thereby preload the bleed member or bleed valve assembly. If the fluid chamber or cushion member is over-inflated, the user may use the bleed member to vent excess fluid therefrom. To vent excess fluid, the user may unseat the sealing member from the aperture either by pushing the sealing member away from the wall member surrounding the aperture or by pulling the wall member surrounding the aperture away from the sealing member.

The bleed member or bleed valve assembly can be further incorporated in a bladder member according to the present invention to vent excess fluid therefrom when the bladder member is over-inflated.

BRIEF DESCRIPTION OF THE DRAWINGS

The detailed description of the present invention will be better understood in conjunction with the accompanying drawings, wherein like reference characters represent like elements, as follows:

FIG. 1 is a front elevational view of a bladder member including a bleed valve assembly formed in accordance with the principles of the present invention;

FIG. 2 is a side elevational view of a bladder member, such as shown in FIG. 1, attached to an article;

FIG. 3 is a partial cross-sectional view of a bladder member showing a bleed valve assembly of the present invention;

FIG. 4 is a partial cross-sectional view of a bladder member showing an alternative bleed valve assembly of the present invention;

DETAILED DESCRIPTION OF THE INVENTION

Figure 5:
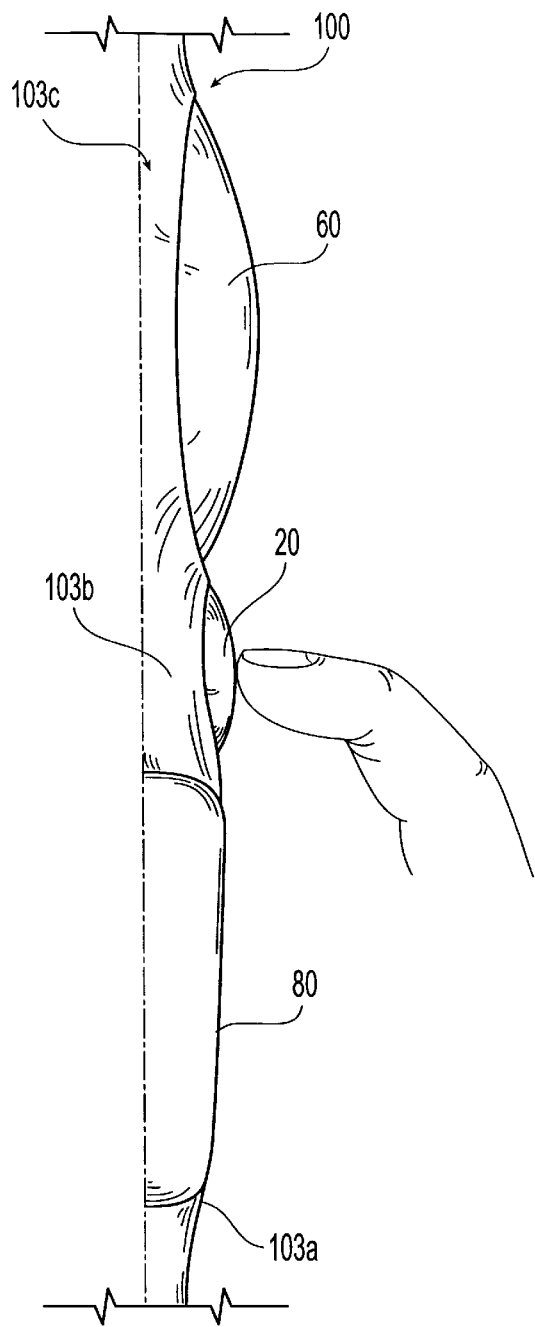
FIG. 5 shows the operation of the bleed valve assembly after the bladder member is attached to a hand-held article.

FIG. 1 shows an exemplary bladder member 10 which employs a bleed valve assembly 20 or a bleed member 30 embodying the principles of the present invention. Bleed member 30 is adapted for use with a fluid chamber 24 for venting excess fluid therefrom.

Exemplary bladder member 10 has three integrated sections, namely, a bleed valve assembly 20 formed according to the present invention, an optional pump member 60, and an inflatable cushion member 80. Fluid chamber 24 may be formed in a bleed valve assembly 20 separately from cushion member 80 or may be coextensive with a cushion chamber 84 within cushion member 80. Bladder member 10 can be configured to fit and to be mounted onto various articles, particularly hand-held articles such as writing instruments, razors, tools, and sports equipment handles. When so fitted and mounted, bladder member 10 can effectively provide the user with a shock-absorbing and/or comfortable feeling grip. Bleed valve assembly 20 of the present invention is designed so that it fluidly communicates with cushion member 80 to effect venting of cushion member 80 as desired. Pump member 60 is capable of filling a fluid, such as gas or liquid, into at least one of bleed valve assembly 20 and cushion member 80.

FIG. 2 illustrates an exemplary bladder member 10 of the present invention fitted and mounted on a main body portion 103 of an article 100. In particular, inflatable cushion member 80 preferably is mounted to at least a gripping portion 103a of article 100. In a preferred embodiment, cushion member 80 wraps around and is mounted onto gripping portion 103a of article 100 to provide either shock absorption or a comfortable grip for the user. Pump member 60 may be mounted onto any convenient location, such as on gripping portion 103a as well, or on. portions 103b and 103c adjacent to gripping portion 103a.

It will be appreciated that although bleed valve assembly 20, pump member 60, and cushion member 80 are illustrated as separate elements, any two or all three elements may be consolidated into an integral element instead. More specifically, bleed valve assembly 20 may be formed integrally with and as a part of cushion member 80, or may be a separate element fluidly connected to cushion member 80, as described in greater detail below. Furthermore, pump member 60 may be a separately formed element capable of selective fluid communication with one or both of bleed valve assembly 20 and cushion member 80. Alternatively, pump member 60 may be permanently coupled to bleed valve assembly 20 and/or cushion member 80, or may even be formed integrally with one of bleed valve assembly 20 and cushion member 80, or with both when all three sections are formed as a single element.

FIGS. 3 and 4 illustrate various details of a bleed valve assembly 20 formed in accordance with the principles of the present invention. In the embodiment of FIGS. 3 and 4, bleed valve assembly 20 is formed separately from cushion member 80 and has an enclosed wall member 22 defining a fluid chamber 24 therein for retaining a fluid. However, it will be appreciated as noted above, that wall member 22 and fluid chamber 24 may be coextensive with a cushion wall member 82 and cushion chamber 84 of cushion member 80. Wall member 22 seals the fluid therein in a fluid-tight manner and prevents such fluid from inadvertently leaking out of fluid chamber 24. It will be appreciated that reference to a "wall member" is non-limiting and has been selected for the sake of simplicity in referencing the element defining fluid chamber 24.

Wall member 22 may be made of a flexible material capable of deforming subject to a force applied to unseat sealing member 36 as described below. More preferably, wall member 22 can be made of an elastic material so that it is capable of readily resuming its shape after the force is released. The elasticity of wall member 22 is also advantageous (although not critical) for the convenience of the venting action of bleed valve assembly 20, as will be appreciated with reference to the venting action described in greater detail below.

Another preferred characteristic of wall member 22, not necessarily accompanying the above-described flexibility, is that wall member 22 is made of a material that can be easily sealed to form an air-tight fluid chamber 24. For example, wall member 22 may be formed from a material such as a thermoplastic material capable of any sealing process known to those of ordinary skill in the art, such as heat-sealing, radio-frequency energy sealing, or other conventional processes. In a preferred embodiment, wall member 22 of bleed valve assembly 20 is made of the same material as that of wall member 62 of pump member 60 and/or wall member 82 of cushion member 80, and wall member 22 is formed as an integral one-piece member with one or both of wall members 62, 82. Alternatively, or in addition, wall member 22 may include a pair of sheets 22a and 22b sealed together, preferably along their edges, to form fluid chamber 24 therebetween.

Fluid chamber 24 in bleed valve assembly 20 fluidly communicates with cushion chamber 84 within cushion member 80 so that the fluid pressure in fluid chamber 24 and in cushion chamber 84 are substantially the same. Alternatively, fluid chamber 24 may be formed integrally with and as a part of and substantially coextensive with cushion chamber 84. Further, fluid chamber 24 fluidly communicates with pump member 60 for purposes of inflating cushion member 80.

A bleed member 30 is provided in bleed valve assembly 20 for venting excess fluid from fluid chamber 24. Bleed member 30 preferably includes an aperture 32 defined in the wall member 22 so that fluid in fluid chamber 24 may be vented therethrough. Bleed member 30 also includes a sealing member 36 located inside fluid chamber 24 for selectively sealing aperture 32, such as by covering aperture 32. It is preferred that the sealing member 36 is a flap member 37. Sealing member 36 can be partially fixed to wall member 22 to retain the relative position between sealing member 36 and aperture 32 in wall member 22.

Various characteristics and/or specifications of sealing member 36 are selected so that sealing member 36 effects a fluid-tight sealing of aperture 32 in the preloading state yet may be unseated in a venting state upon application of a dislodging force to permit bleeding of fluid from fluid chamber 24 via bleed member 30. For instance, the material, size, and thickness of sealing member 36 may be selected to achieve the above-described sealing and venting states in the most effective and practical manner.

In a preferred embodiment, wall member 22 and sealing member 36 in bleed valve assembly 20 are made of materials which permit sealing member 36 and wall member 22 to conform intimately with and/or to be attracted to each other to form a substantially fluid-tight seal therebetween upon contact. In particular, sealing member 36 may be made of a flexible or soft material that allows sealing member 36 to provide an intimate fluid-excluding occlusive seal with at least the portion of wall member 22 surrounding aperture 32. As a result, sealing member 36 fluid-tightly covers and seals aperture 32 in a preloading state to prevent fluid from escaping fluid chamber 24. Such property of wall member 22 and/or sealing member 36 is referenced as "sealable" or "sealability" for the sake of convenience. Nonetheless, the material of sealing member 36 most preferably permits sealing member 36 to be forced to be unseated or dislodged from aperture 32 to vent fluid from fluid chamber 24 in a venting state, as described in further detail below.

Alternatively or in addition, sealing member 36 may be made of a flexible material. Preferably, sealing member 36 is a flexible flap member capable of conforming to the portion of wall member 22 in which aperture 32 is formed. It will be appreciated that flexibility and sealability are separate and independent aspects of the present invention, each, at least alone, having unique benefits which are desirable for, yet not critical to, the present invention. In a preferred embodiment, sealing member 36 is made of a material that is flexible and is also sealable to the material of wall member 22.

Fluid contained in fluid chamber 24 can assist in biasing sealing member 36 against a corresponding portion of wall member 22 surrounding aperture 32. Alternatively, or in addition, a support member 40 may be provided within fluid chamber 24 to assist in biasing sealing member 36 against aperture 32 in a preloading state. Optional support member 40 is located inside bleed fluid chamber 24 in a position convenient for biasing sealing member 36 against a corresponding portion of wall member 22 surrounding aperture 32 in a preloading state. Preferably, support member 40 is made of a resilient and flexible material so that it can yield in the venting state and resume its shape in the preloading state. Thereby, support member 40 can assist in biasing sealing member 36 against a corresponding portion of wall member 22 surrounding aperture 32 to seal aperture 32 and to retain fluid inside fluid chamber 24 in a preloading state. Support member 40 is particularly useful when sealing member 36 and wall member 22 are not sealable.

Support member 40 is preferably made of a material that is compatible with wall member 22. In a preferred embodiment, support member 40 is a foam member such as an open-cell polyurethane foam 41. In addition, support member 40 can be made of a material, such as a thermoplastic material, which permits foam member 41 to be joined with the wall member 22 through heat-sealing, radio-frequency energy sealing, or other conventional processes.

Support member 40 and sealing member 36 may, in addition or instead, be made of sealable materials so that sealing member 36 tends to adhere to support member 40. The sealability of support member 40 and sealing member 36 is helpful in retaining the relative positions of support member 40 and sealing member 36. Thereby, sealing member 36 will not be inadvertently displaced from support member 40, thus avoiding or at least minimizing potential leakage problems. The formation of support member 40 and sealing member 36 from sealable materials is particularly advantageous in assisting sealing member 36 in resuming its sealing position after being subjected to deformation in the venting process. As a result, support member 40 can ensure the proper relationship between sealing member 36 and its corresponding portion of wall member 22 and thus secure the sealing between sealing member 36 and aperture 32 in the preloading state.

Support member 40 preferably is shaped and sized to fit within fluid chamber 24. In particular, support member 40 is so shaped and sized that it is capable of maintaining its appropriate position with respect to sealing member 36, even after being subjected to deformation in a venting state, to thereby bias sealing member 36 into a preloading state to seal aperture 32. In a preferred embodiment, support member 40 is shaped and sized to substantially fill the entire fluid chamber 24. As a result, support member 40 is unlikely to shift around inside fluid chamber 24 and thus ensures the proper support of sealing member 36. In an alternative embodiment, support member 40 is partially fixed to wall member 22 of bleed valve assembly 20 to secure the relative position between support member 40 and aperture 32 and, in turn, the relative position between sealing member 36 and aperture 32.

Bladder member 10 may be provided with an inlet member 50, partially defined in wall member 22 of bleed valve assembly 20 in the embodiment of FIGS. 3 and 4, through which an inflating fluid may enter fluid chamber 24. When a sufficient amount of fluid is introduced into fluid chamber 24, sealing member 36 is capable of covering and sealing aperture 32 from venting fluid out of fluid chamber 24 even if sealing member 36 and wall member 22 are not sealable. This arrangement can also constitute a preloading state of bleed valve assembly 20, in which sealing member 36 covers and seals aperture 32 in a fluid-tight manner.

In a preferred embodiment, a one-way valve, such as a "duck-bill" valve 51, is provided in inlet member 50 to allow an inflating fluid to enter bleed valve assembly 20 or cushion member 80 while preventing the inflated fluid from inadvertently escaping through inlet member 50. For the sake of simplicity, reference is made to a duck-bill valve embodiment even though other types of valves may be provided at inlet member 50. Main body 56 of duck-bill valve 51 is preferably located inside fluid chamber 24. Inlet end 52 of duck-bill valve 51 preferably is sealingly joined to the portion of wall member 22 surrounding inlet member 50, leaving only inlet duct 54 to communicate between a fluid source, such as pump member 60, and fluid chamber 24. Duck-bill valve 51 preferably is made of a material compatible with that of wall member 22 to facilitate establishment of a seal therebetween.

In a preferred embodiment as shown in FIG. 4, duck-bill valve 51 has dual functions. On the one hand, inlet end 52 of duck-bill valve 51 functions as an inlet member 50 as discussed above. On the other hand, main body 56 of duck-bill valve 51 also functions as sealing member 36. In this embodiment, the characteristics of duck-bill valve 51, such as material, size and thickness, preferably are similar to those of flap member 37, as discussed above. When duck-bill valve 51 is also used to cover and seal aperture 32, an additional sealing member 36 is no longer necessary. Therefore, the structure of bleed valve assembly 20 is further simplified. It will be appreciated that any type of valve member other than a duck-bill valve may serve such dual functions.

Bladder member 10 can be inflated by filling a fluid into fluid chamber 24 and cushion chamber 84, such as through inlet member 50, in any desired manner known to those of ordinary skill in the art. For example, various types of pump members can be used to fill fluid chamber 24 and cushion chamber 84. Depending on specific applications of bladder member 10, the fluid pressure inside fluid chamber 24 and cushion chamber 84 may vary accordingly.

FIGS. 3 and 4 show an exemplary pump member 60 which may be used to fill fluid chamber 24, as described in U.S. Pat. No. 5,144,708 issued to Pekar, which patent is incorporated herein by reference in its entirety. Pump member 60 has a pump wall member 62 defining a pump chamber 64 therein. Pump wall member 62 can be formed of any material and by any manner that can effectively seal fluid, such as gas or liquid, within pump chamber 64. Preferably, wall member 62 is formed of a flexible material that is capable of deforming. In a preferred embodiment, wall member 62 is made of a material that can be easily sealed to a similar material such as through heat-sealing, radio-frequency energy, or other conventional processes.

Pump member 60 may also have an inlet opening 66 defined in pump wall member 62 for communicating with a fluid source, such as ambient air (see FIG. 1). Inlet opening 66 is designed to intake a desired amount of inflating fluid from a fluid source.

Pump member 60 may be formed integrally with bleed valve assembly 20 and/or cushion member 80, particularly when pump wall member 62 is integrally formed with valve wall member 22 and/or cushion wall member 82. In another preferred embodiment, pump member 60 may be a physically independent structure which is selectively coupled to bleed valve assembly 20 to fill fluid chamber 24 as desired and then physically separated therefrom. If pump member 60 is separate from either bleed valve assembly 20 or cushion member 80, pump member 60 can have an outlet passage 68 communicating with fluid chamber 24 or cushion chamber 84 in cushion member 80. However, regardless of whether pump wall member 62 and bleed valve assembly wall member 22 are coextensive, pump chamber 64 may nonetheless be isolated from fluid chamber 24.

In a preferred embodiment, a support member 70, such as a foam member 71 or other filler member, is provided within and surrounded and enclosed by pump wall member 62. In a further preferred embodiment, foam member 71 in the pump chamber 60 and foam member 41 inside fluid chamber 24 are a one-piece support member. The formation of support members 40 and 70 from the same unitary element simplifies the structure and manufacture of bladder member 10. It will be appreciated that a seal separating fluid chamber 24 and pump chamber 64 may be established over and across support members 40 and 70 as well.

As discussed above, fluid filled into fluid chamber 24, such as by pump member 60, effects filling of cushion member 80. Cushion member 80 includes a cushion wall member 82 which defines a cushion chamber 84 therein for retaining an inflated fluid. Cushion chamber 84 may be formed separately from, yet in fluid communication with, fluid chamber 24, such that filling of fluid chamber 24 indirectly effects filling of cushion chamber 84. Alternatively, bleed valve assembly 20 may be provided in cushion member 80 such that fluid chamber 24 and cushion chamber 84 are substantially coextensive and filling of fluid chamber 24 directly effects filling of cushion chamber 84.

Cushion member 80 can be formed in various shapes or made of different materials to adapt to specific applications. As discussed below, the pressure inside cushion member 80 can also vary depending on specific applications. For purpose of shock absorption and comfortable grip, cushion wall member 82 is preferably made of a flexible material so that it may deform upon assertion of a force. More preferably, wall member 82 can be made of elastic material so that it is capable of resuming its shape once the force is released.

In a preferred embodiment, cushion wall member 82 is made of a material similar to those of valve wall member 22 and pump wall member 62. Moreover, any two of valve wall member 22, pump wall member 62, and cushion wall member 82 can at least be partially integrated, such as by being formed from a unitary one-piece member. In another preferred embodiment, all three wall members 22, 62, and 82 of bladder member 10 form a unitary one-piece element. The unitary one-piece member may define a common chamber or may be sealed at selected locations to define a separate chamber for each of bleed valve assembly 20, pump member 60, and cushion member 80. The unitary bladder member 10 thus has a simpler structure and is easier to manufacture.

The materials that can be used for wall members 22, 62 and 82, and sealing member 36 preferably are fluid-tight materials. Moreover, wall members 22, 62, and 82, sealing member 36, and support members 40 and 70 may be formed from materials which permit sealing of such materials with respect to each other. Exemplary materials are natural or synthetic elastomers, which are either cross-linked or non-cross-linked, thermoplastic elastomers, halogenated elastomers, thermoplastics, vinyls, polyurethane, polyethylene, polyvinyl chloride, polyvinylidene chloride, or polyvinylidene fluoride or any other material known by one of ordinary skill in the art to be suitable for the purposes thereof. In addition, duck-bill valve 51 preferably is formed of the same material as or a material compatible with wall member 22, such as a material which would permit sealing of duckbill valve 51 to wall member 22.

The use and function of bleed member 30 and bleed valve assembly 20 of the present invention will now be described in connection with cushion member 80, in which bleed member 30 or bleed valve assembly 20 is incorporated. Bleed member 30 or bleed valve assembly 20 is capable of venting excess fluid from cushion chamber 84 of cushion member 80 and therefore facilitates in adjusting the pressure inside cushion chamber 84.

Cushion member 80 can be inflated in various ways, such as by industrial inflating equipment during manufacture of bladder member 10 or, in the alternative, through a pump member provided separately or as a part of bladder member 10 once bladder member 10 has been mounted onto article 100. Moreover, inflation is carried out to a desired pressure so that cushion member 80 can either provide sufficient shock absorption, such as when used on impact tools or vibrating elements, or simply a comfortable grip, such as when used in connection with hand-held articles, depending on the desired specific application. Generally, though not necessarily, the pressure within cushion member 80 is higher when cushion member 80 is used for shock absorption than for a comfortable grip.

In an exemplary embodiment, cushion member 80 is inflated by using pump member 60, such as the pump in U.S. Pat. No. 5,144,708 issued to Pekar. Bladder member 10 is first fitted and mounted onto an article 100, in particular a gripping portion thereof. More specifically, the user may seal inlet opening 66 defined in pump wall member 62 and then depress pump wall member 62. As a result, a fluid will enter bleed valve assembly 20 and cushion member 80. The user may then release inlet opening 66 so that pump member 60 may intake another amount of fluid. After the above steps have been repeated a desired number of times, cushion member 80 will be inflated to a desired pressure to provide both shock absorption and a comfortable grip for the user. By any inflating method used, cushion member 80 can be inflated to a desired pressure.

Because bleed valve assembly 20 is fluidly communicated with cushion member 80, the pressure in bleed valve assembly 20 and in cushion member 80 are substantially the same. When bleed valve assembly 20 is sufficient inflated, sealing member 36 is biased against a portion of wall member 22 surrounding aperture 32 and seals the same, which is referenced as the preloading state of the present invention.

Nevertheless, the preloading state of the present invention can be achieved in various manners. In a first embodiment, fluid chamber 24 is so inflated that the fluid pressure therein exceeds the ambient pressure outside wall member 22. As a result, sealing member 36 is biased against a portion of wall member 22 surrounding aperture 32 and seals the same. In a second embodiment, support member 40 can be provided in an inflated fluid chamber 24 to assist in sealing aperture 32. According to the second embodiment, a preloading state can be achieved with a lower pressure inside the inflated fluid chamber 24. In a third embodiment, support member 40 can be used alone to bias sealing member 36 to seal aperture 32 without requiring fluid chamber 24 to be inflated.

Figure 6:
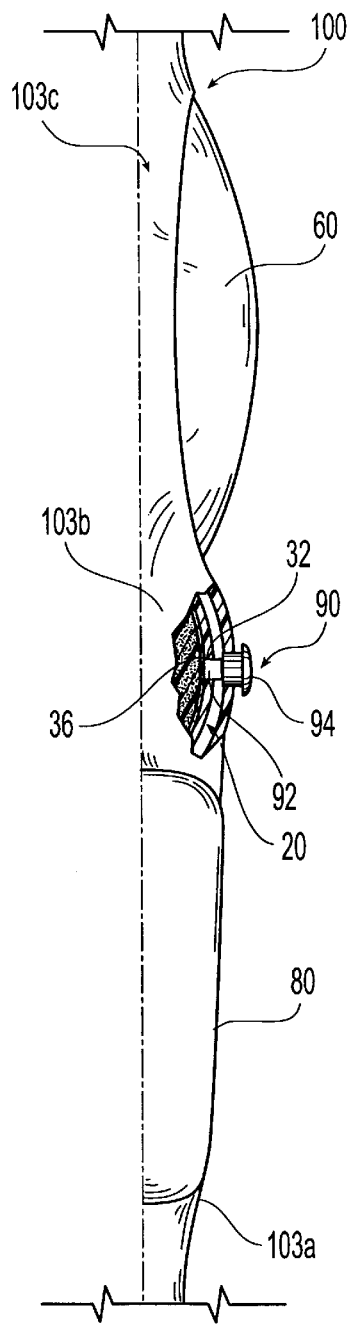
FIG. 6 shows an alternative operation of the bleed valve assembly after the bladder member is attached to a hand-held article.

When cushion member 80 is over-inflated, bleed valve assembly 20 can be used to release excess fluid from cushion member 80 until a desired pressure is reached inside cushion member 80. FIG. 5 and FIG. 6 illustrate exemplary manners of using bleed valve assembly 10 of the present invention to vent fluid from cushion member 80.

To vent excess fluid from within fluid chamber 24 or cushion chamber 84, the user may apply force to bleed valve assembly 20 in the vicinity of aperture 32. The deformation of at least one of wall member 22 and sealing member 36 can unseat or dislodge sealing member 36 from aperture 32 to thereby release fluid out of fluid chamber 24 through aperture 32. The user may push directly on aperture 32 so as to cause sealing member 36 to deform and/or dislodge from aperture 32. Alternatively, the user may pull wall member 22 away from bleed valve assembly 20. The deformation of wall member 22 can effectively unseat or dislodge sealing member 36.

In another embodiment, as shown in FIG. 6, a push button 90 may be provided for dislodging sealing member 36. Push button 90 has a short end 92 that can extend through aperture 32 to act on sealing member 36 when the user presses push button 90 towards fluid chamber 24. For the convenience of the user, push button 90 can have an enlarged end 94 to accommodate the user's finger tip. In addition, push button 90 can be mounted on article 100 at a convenient location so that the user may easily reach push button 90 to adjust the pressure inside cushion member 80.

By repeating the inflating and bleeding processes, the pressure in cushion member 80 may be adjusted to reach a desired level. Thereby, cushion member 80 on bladder member 10 is capable of providing either a sufficient shock absorption or a comfortable grip for the user. Moreover, adjustment can be carried out repeatedly during use of bladder member 10.

It will be appreciated that the various features described herein may be used singly or in any combination thereof. Therefore, the present invention is not limited to only the embodiments specifically described herein. While the foregoing description and drawings represent a preferred embodiment of the present invention, it will be understood that various additions, modifications and substitutions may be made therein without departing from the spirit and scope of the present invention as defined in the accompanying claims. In particular, it will be clear to those skilled in the art that bleed valve assembly of the present invention may be applied to any type of chamber filled with fluid and application to the bladder member described herein is merely exemplary and not limiting. The presently disclosed embodiment is therefore to be considered in all respects as illustrative and not restrictive, the scope of the invention being indicated by the appended claims, and not limited to the foregoing description.

What is claimed is:

1. A bleed member provided in a bleed valve assembly having a wall member defying a fluid chamber for retaining a fluid therein, said bleed member comprising:

an aperture defined in the wall member;

a flexible sealing member located inside the fluid chamber for selectively covering and sealing said aperture; and a resilient support member located inside the fluid chamber for biasing said sealing member against a corresponding portion on the wall member to seal said aperture;

wherein, in a preloading state, said flexible sealing member covers and seals said aperture and, in a venting state, said sealing member is forced to be unseated from said aperture to vent fluid from said fluid chamber.

2. A bleed member as in claim 1, wherein said sealing member is a flexible flap member partially fixed to the wall member of the fluid chamber.

3. A bleed member as in claim 1, wherein said support member is a foam member shaped to be accommodated in the fluid chamber.

4. A bleed member as in claim 1, wherein:

fluid is introduced into the fluid chamber via a valve provided in an inlet in the wall member; and the valve functions as said sealing member.

5. A bleed member provided in a bleed valve assembly having a wall member defining a fluid chamber for retaining a fluid therein, said bleed member comprising:

an aperture defined in the wall member;

a flexible sealing member located inside the fluid chamber for selectively covering and sealing said aperture; and wherein, in a preloading state, said flexible sealing member covers and seals said aperture and, in a venting state, said sealing member is forced to be unseated from said aperture to vent fluid from said fluid chamber;

wherein the wall member is made of a flexible material such that said flexible sealing member and the wall member conform in shape and configuration.

6. A bleed member as in claim 5, wherein said sealing member is made of a material selected from the group consisting of: natural or synthetic elastomers which are either cross-linked or non-cross-linked, thermoplastic elastomers, vinyls, polyurethane, polyethylene, polyvinylchloride, polyvinylidene chloride, polyvinylidene fluoride, and halogenated elastomers.

7. A bleed member provided in a bleed valve assembly having a wall member defining a fluid chamber for retaining a fluid therein, said bleed member comprising:

an aperture defined in the wall member; and a sealing member located inside the fluid chamber for selectively covering and sealing said aperture;

wherein the wall member and said sealing member arc made of sealable materials so that said sealing member is attracted to and in intimate contact with a corresponding portion of the wall member to seal said aperture in a preloading state yet is capable of being forced to be unseated from said aperture to vent fluid from said fluid chamber in a venting state.

8. A bleed member as in claim 7, wherein both said sealing member and the wall member are made of a flexible material.

9. A bleed member as in claim 7, wherein both said sealing member and the wall member are made of an elastic material.

10. A bleed member as in claim 7, wherein said sealing member is made of a material selected from the group consisting of: natural or synthetic elastomers which are either cross-linked or non-cross-linked, thermoplastic elastomers, vinyls, polyurethane, polyethylene, polyvinylchloride, polyvinylidene chloride, polyvinylidene fluoride, and halogenated elastomers.

11. A bleed valve assembly comprising:
   a fluid chamber formed by an enclosed flexible wall member for retaining a fluid therein; and
   a bleed member for venting excess fluid from said fluid chamber, said bleed member comprising an aperture defined in said wall member and a sealing member located inside said fluid chamber for selectively covering and sealing said aperture;
   wherein:
      in a preloading state, fluid pressure inside said fluid chamber is higher than pressure outside said fluid chamber, and said sealing member is biased against a corresponding portion of said wall member to cover and seal said aperture; and
      in a venting state, said sealing member is forced to be unseated from said aperture to vent fluid from said fluid chamber.

12. A bleed valve assembly as in claim 11, wherein said fluid chamber is a cushion member and said bleed member is provided on a wall member of said cushion member.

13. A bleed valve assembly as in claim 11, further comprising an inlet member at least partially defined in said wall member for introducing a fluid into said fluid chamber.

14. A bleed valve assembly as in claim 11, further including a one-way valve provided within said inlet member.

15. A bleed valve assembly as in claim 11, wherein said one-way valve functions as said sealing member.

16. A method of operating a bleed valve assembly, said method comprising:
   providing a bleed valve assembly in fluid communication with a fluid chamber, the bleed valve assembly having a sealing member located inside the fluid chamber covering an aperture in a flexible wall member of the fluid chamber so that the sealing member covers and seals the aperture in the wall member, and
   unseating the sealing member from the wall member to allow excess fluid to vent from the fluid chamber.

17. A method of operating a bleed valve assembly as in claim 16, further comprising providing a support member inside the fluid chamber to bias the sealing member against a corresponding portion of the wall member surrounding the aperture.

18. A method of operating a bleed valve assembly as in claim 16, further comprising filling the fluid chamber with a fluid to bias the sealing member against a corresponding portion of the wall member surround the aperture.

19. A method of operating a bleed valve assembly as in claim 16, wherein unseating comprises pushing the sealing member into the fluid chamber through the aperture in the wall member.

20. A method of operating a bleed valve assembly as in claim 19, wherein pushing comprises using a button that is capable of extending through the aperture in the wall member.

21. A method of operating a bleed valve assembly as in claim 16, wherein unseating comprises pulling the corresponding wall member away from the sealing member.

22. A method of operating a bleed valve assembly as in claim 16, further comprising repeatedly filling the fluid chamber and unseating the sealing member to reach a desired pressure in the fluid chamber.

23. A bladder member comprising:
   a fluid chamber defined by an enclosed wall member for containing a fluid;
   a pump member for filling the fluid chamber with a fluid;
   an inlet member at least partially defined in said wall member for introducing a fluid from said pump member into said fluid chamber; and
   a bleed member for venting excess fluid from said fluid chamber, said bleed member comprising an aperture located in said wall member and a sealing member located inside the fluid chamber for selectively covering and sealing said aperture;
   wherein:
      said bleed member has a streamlined configuration;
      in a preloading state, said sealing member seals said aperture, and
      in a venting state, said sealing member is forced to be unseated from said aperture to vent fluid from said fluid chamber through said aperture.

24. A bladder member as in claim 23, wherein a one-way valve is provided in said inlet member between said pump member and said fluid chamber.

25. A bladder member as in claim 23, further comprising a support member located inside said fluid chamber for assisting said sealing member in sealing said aperture.

26. A bladder member as in claim 25, wherein said support member is a foam member partially fixed to said fluid chamber.

27. A bladder member as in claim 25, wherein:
   said pump member comprises a pump chamber defined by an enclosed pump wall member and a support member provided in said pump chamber; and
   said support members in said pump member and in said fluid chamber are integrally formed.

28. A bladder member as in claim 23, further comprising a cushion member formed by an enclosed wall member and in fluid communication with said fluid chamber.

* * * * *